(12) United States Patent
Han et al.

(10) Patent No.: US 10,764,049 B2
(45) Date of Patent: Sep. 1, 2020

(54) METHOD FOR DETERMINING APPROVAL FOR ACCESS TO GATE THROUGH NETWORK, AND SERVER AND COMPUTER-READABLE RECORDING MEDIA USING THE SAME

(71) Applicant: AIRCUVE INC., Seoul (KR)

(72) Inventors: You Serk Han, Seoul (KR); Sang Hun Seok, Seoul (KR)

(73) Assignee: AIRCUVE INC., Seoul (KR)

( * ) Notice: Subject to any disclaimer, the term of this patent is extended or adjusted under 35 U.S.C. 154(b) by 0 days.

(21) Appl. No.: 15/572,905

(22) PCT Filed: Jul. 6, 2017

(86) PCT No.: PCT/KR2017/007225
§ 371 (c)(1),
(2) Date: Nov. 9, 2017

(87) PCT Pub. No.: WO2018/026109
PCT Pub. Date: Feb. 8, 2018

(65) Prior Publication Data
US 2020/0036525 A1 Jan. 30, 2020

(30) Foreign Application Priority Data
Aug. 4, 2016 (KR) .................. 10-2016-0099378

(51) Int. Cl.
*H04L 9/32* (2006.01)
*G07C 9/00* (2020.01)
(Continued)

(52) U.S. Cl.
CPC ............ *H04L 9/32* (2013.01); *G07C 9/00174* (2013.01); *H04L 29/08* (2013.01); *H04L 63/08* (2013.01); *H04L 63/10* (2013.01)

(58) Field of Classification Search
CPC . H04L 9/32; H04L 63/08; H04L 29/08; H04L 63/10; G07C 9/00174
(Continued)

(56) References Cited

U.S. PATENT DOCUMENTS 8,117,454 B2 * 2/2012 Forsberg ................. H04L 63/08
713/176
8,156,333 B2 * 4/2012 Schneider ............. H04L 9/3271
713/150
(Continued)

FOREIGN PATENT DOCUMENTS

KR 10-0979182 B1 8/2010
KR 10-1233326 B1 2/2013
(Continued)

*Primary Examiner* — Taghi T Arani
*Assistant Examiner* — Badri Narayanan Champakesan
(74) *Attorney, Agent, or Firm* — Heeding Chae; Lucem, PC

(57) ABSTRACT

A method for determining approval for access to a gate through a network, a server, and computer readable recoding media using the same, and more particularly, to a method for determining approval for access to a gate through a network, a server, and computer readable recoding media using the same so as to determine access to a gate for using a service by allowing an authorizer (user) to determine an approval for a service access at the time of using the service without input of a password or the like. It is possible to use one-time and effective identification only when approval for the access to the corresponding gate is determined at the time of requiring the authority for the approval for the access to the service gate.

14 Claims, 6 Drawing Sheets

(51) Int. Cl.
*H04L 29/08* (2006.01)
*H04L 29/06* (2006.01)

(58) Field of Classification Search
USPC .............................................................. 726/4
See application file for complete search history.

(56) References Cited

U.S. PATENT DOCUMENTS

| | | | | |
|---|---|---|---|---|
| 9,100,206 | B1* | 8/2015 | Barth | H04L 12/2801 |
| 9,565,212 | B2* | 2/2017 | Faltyn | H04W 12/08 |
| 9,787,669 | B2* | 10/2017 | Bransom | H04L 9/321 |
| 2008/0189774 | A1* | 8/2008 | Ansari | H04L 47/80 |
| | | | | 726/7 |
| 2012/0182939 | A1* | 7/2012 | Rajan | G06F 19/3418 |
| | | | | 370/328 |
| 2012/0276872 | A1* | 11/2012 | Knauth | H04L 63/18 |
| | | | | 455/411 |
| 2012/0331300 | A1* | 12/2012 | Das | G06F 3/1454 |
| | | | | 713/176 |
| 2014/0289830 | A1* | 9/2014 | Lemaster | H04L 63/08 |
| | | | | 726/7 |
| 2014/0366080 | A1* | 12/2014 | Gupta | H04W 4/60 |
| | | | | 726/1 |
| 2014/0373121 | A1* | 12/2014 | Wied | H04L 63/0815 |
| | | | | 726/7 |
| 2015/0381567 | A1* | 12/2015 | Johnson | H04L 45/54 |
| | | | | 726/12 |
| 2017/0339190 | A1* | 11/2017 | Epstein | H04L 63/1416 |

FOREIGN PATENT DOCUMENTS

| | | |
|---|---|---|
| KR | 10-1404537 B1 | 6/2014 |
| KR | 10-2015-0124868 A | 11/2015 |
| KR | 10-1595413 B1 | 2/2016 |

\* cited by examiner

METHOD FOR DETERMINING APPROVAL FOR ACCESS TO GATE THROUGH NETWORK, AND SERVER AND COMPUTER-READABLE RECORDING MEDIA USING THE SAME

CROSS-REFERENCE TO RELATED APPLICATION

This application claims the benefit of Korean Application No. 10-2016-0099378, filed on August 4, Korean Application No. 10-2016-0099378, filed on Aug. 4,2016 with the Korean Intellectual Property Office, the disclosure of which is incorporated herein by reference. This application is one of the results of GSIP (Global SaaS incubating Project) (Project No. C1201-17-1042 (2017.05.01-2017.1 1.30, Project Name: Development of M FA(Multi-Factor Authentication) SaaS) hosted by Ministry of Science and ICT (MSIT) and National IT Industry Promotion Agency (NIPA) in Republic of Korea.

TECHNICAL FIELD

The present invention relates to a method for determining approval for access to a gate through a network, a server, and computer readable recoding media using the same, and more particularly, to a method for determining approval for access to a gate through a network, a server, and computer readable recoding media using the same so as to determine access to a gate for us in a service by allowing an authorizer (user) to determine an approval for a service access at the time of using the service without input of a password or the like.

BACKGROUND ART

Any type of login or authentication procedure in an IT environment includes a process of verifying an authorized user. That is, the user may use the corresponding service by verifying the identity of any person to be allocated with specific authority.

For the identification, a method of using knowledge-based information that receives information which is considered to be known only to a party, such as an ID and a password, is generally used.

However, in the method of using the knowledge-based information such as an ID and a password, it is inconvenient for a user to always input an ID and a password for verification of the identity, and there is a disadvantage in that the user does not access the corresponding service when the user does not remember the ID and the password.

Further, recently, as various security treats increase, security accidents due to leakage and illegal stealing of the ID, the password, and the like frequently occur and various cyber crimes and property damages occur by the leakage of personal information online.

Accordingly, in order to prevent the damage of leakage and stealing of the ID, the password, and the like, in addition to the ID and the password, a method of using possession-based information to receive information about the possession of only the party such as a one-time password (OTP) and certificate, a method of using bio-based information to receive biological information of the party such as fingerprint, iris, voice and facial recognition, and the like have been used.

However, in the conventional methods using knowledge-based information, possession-based information, and bio-based information, the personal identification information is fixed and permanent. Therefore, it is inconvenient to update the identification information when the identification information is leaked and periodically update the identification information in order to maintain the security. In particular, when the bio-based information is used, since the identification information is information that can not be updated, there is a problem that it is very vulnerable to security due to information leakage. In addition, in the conventional methods, since essential personal information such as a date of birth, a resident registration number, and the like of the user is stored in a server, many social problems arise from theft of personal information upon personal information leakage by hacking and the like.

In addition, in the conventional methods, since the personal static attribute is reflected to the identification information, the identification information and association with the user who uses the identification information may be easily tracked on the Internet. Accordingly, there is a problem in that the methods are weak in terms of protection of personal information.

In addition, in the conventional methods, since the authorities to access personal information and services are controlled by art administrator and allows access to services according to the personal information stored in the account database of the service, there is a risk that unauthorized service can be used when the personal information is exposed to a third party.

In addition, when the personal identification information is provided to the third party to temporarily use the service, there is an inconvenience that the identification needs to be updated after the identification information of the user is exposed to the third party.

DISCLOSURE

Technical Problem

An object of the present invention is to solve all the aforementioned problems.

Another object of the present invention is to provide a method for determining access to a service gate using dynamic and one-time identification information.

Yet another object of the present invention is to manage access to a service gate by a user without inputting information such as a password.

Yet another object of the present invention is to enable a third party to access the corresponding service without exposure of the identification information using the identification of the authorizer.

Technical Solution

In order to achieve the above-described objects of the present invention and to realize specific effects of the present invention to be described below, the characteristic configurations of the present invention are as follows.

According to an exemplary embodiment of the present invention, there is provided a method for determining approval for access to a gate through a network, the method including: (a) transmitting, by an authentication server, service gate information, user information, and an approval request signal for a user to an authorizer terminal when an authentication request signal for the user requesting the access to the service gate using a gate key is received from a service server, to support the authorizer terminal to display the service gate information and the user information and support the authorizer to select the approval in response to the approval request signal; and (b) performing, by the authentication server, authentication for the user with reference to the approval information and transmitting result information on the authentication to the service server when the approval information selected by the authorizer is received from the authorizer terminal, to support the service server to determine approval for the access to the service gate for the user.

According to another exemplary embodiment of the present invention, there is provided a method for determining approval for access to a gate through a network, the method including: (a) transmitting, by a service server, user information corresponding to a gate key, service gate information and an authentication request signal for a user corresponding to the user information to an authentication server when an access request signal for a service gate using the gate key is received from a user terminal, to support the authentication server to transmit the user information, the service gate information, and the approval request signal for the user to the authorizer terminal and support the authentication server to perform the authentication for the user with reference to the approval information selected by the authorizer received from the authorizer terminal; and (b) determining, by the service server, approval for the access to the user terminal for the service gate in response to result information on the authentication when the result information on the authentication for the user is received from the authentication server.

According to yet another exemplary embodiment of the present invention, there is provided an authentication server of determining approval for access to a gate through a network, the authentication server including: a communication unit; and a processor (i) transmitting service gate information, user information, and an approval request signal for the user to an authorizer terminal through the communication unit when an authentication request signal for the user requesting the access to the service gate using a gate key is received from the service server through the communication unit, to support the authorizer terminal to display the service gate information and the user information and support the authorizer to select the approval in response to the approval request signal, and (ii) performing the authentication for the user with reference to the approval information and transmitting result information on the authentication to the service server through the communication unit when the approval information selected by the authorizer is received from the authorizer terminal through the communication unit, to support the service server to determine approval for the access to the service gate for the user.

According to still another exemplary embodiment of the present invention, there is provided a service server of determining approval for access to a gate through a network, the service server including: a communication unit; and a processor (i) transmitting user information corresponding to a gate key, service gate information and an authentication request signal for a user corresponding to the user information to an authentication server through the communication unit when an access request signal for the service gate using the gate key is received from the user terminal through the communication unit, to support the authentication server to transmit the user information, the service gate information, and the approval request signal for the user to the authorizer terminal and support the authentication server to perform the authentication for the user with reference to the approval information selected by the authorizer received from the authorizer terminal, and (ii) determining approval for access of the user terminal to the service gate in response to result information on the authentication when the result information on the authentication for the user is received from the authentication server through the communication unit.

According to still yet another exemplary embodiment of the present invention, there is provided computer readable recording media on which computer programs for executing the method of the present invention are recorded.

Advantageous Effects

According to the present invention, a user (alternatively, an authorizer) may self-manage access to a service gate without inputting information such as a password or the like from the service gate, thereby increasing convenience of the user, and the password or the like is not input, thereby preventing the information such as a password or the like from being leaked from a variety of hacking.

Further, one-time and effective identification is used only when approval for the access to the corresponding gate is determined at the time of requiring the authority for the approval for the access to the service gate, and as a result, even if the identification information or the like is leaked, there is no vulnerability to reuse and arbitrary use by a third party may be prevented, thereby improving security.

Further, an individual (an authorizer or a user) other than a service manager directly verifies personal information, thereby preventing a third party from using the corresponding service by stealing or misusing of the personal information.

Further, the third party may access the service gate without exposing identification information of the user to the third party requiring the access to the service gate, thereby creating a community of sharing highly secure information or facilitating services and tasks that require multi-authority ratings.

MODES OF THE INVENTION

Figure 1:
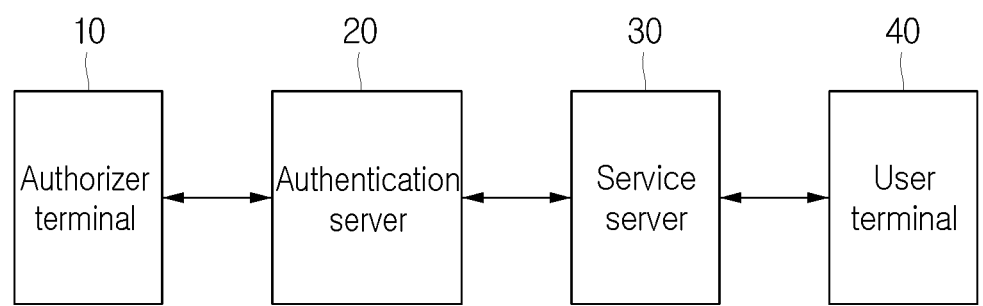
FIG. 1 schematically illustrates a system of performing a method for determining approval for access to a gate through a network according to an exemplary embodiment of the present invention.

The present invention will be described below in detail with reference to the accompanying drawings illustrating specific exemplary embodiments in which the present invention can be implemented as examples. These exemplary embodiments will be sufficiently described in detail enough to implement the present invention by those skilled in the art. It should be understood that various exemplary embodiments of the present invention are different from each other, but need not to be mutually exclusive. For example, a specific figure, a structure, and a characteristic described herein may be implemented as another exemplary embodiment without departing from the spirit and the scope of the present invention in relation to an exemplary embodiment. Further, it should be understood that a position or a displacement of an individual constituent element in each disclosed embodiment may be changed without departing from the spirit and the scope of the present invention. Accordingly, a detailed description below is not taken as a limited meaning, and is defined by the accompanying claims together with all equivalent scopes to the claims if the scope of the present invention is appropriately described. Like reference numerals in the drawing denote the same or similar function throughout several aspects.

Hereinafter, preferred exemplary embodiments of the present invention will be described in detail with reference to the accompanying drawings so that those skilled in the art may easily implement the present invention.

FIG. 1 schematically illustrates a system of performing a method for determining approval for access to a gate through a network according to an exemplary embodiment of the present invention. Referring to FIG. 1, the system may include an authorizer terminal 10, an authentication server 20, a service server 30, and a user terminal 40.

First, the authorizer terminal 10 provides a user interface to allow the authorizer to select approval for a user who requests access to a service gate and transmits approval information selected by the authorizer to the authentication server 20 to support the authentication server to perform authentication for the user. In this case, the gate is a path for accessing a specific service and refers to a logic point where the access is controlled by the authorizer on the access path to the corresponding service. Further, the authorizer terminal 10 may include a dedicated terminal for authentication, a smart watch, a smart phone, a mobile terminal, a pad, a laptop computer, a PC, a cloud service, and the like, and include all terminals which are connected through the network to be accessible the use of the authorizer.

Next, when an authentication request signal for the user requesting the access to the service gate using a gate key is received from the service server 30, the authentication server 20 transmits service gate information, user information, and an approval request signal for the user to the authorizer terminal 10 to support the authorizer terminal 10 to display the service gate information and the user information and support the authorizer to select the approval in response to the approval request signal.

Further, when the approval information selected by the authorizer is received from the authorizer terminal 10, the authentication server 20 performs the authentication for the user with reference to the approval information and transmits result information on authentication to the service server 30 to support the service server 30 to determine approval for the access to the service gate for the user.

In addition, the authentication server 20 compares an identification key for the authentication server which is an identification key corresponding to the authorizer and managed by the authentication server with an identification key for the authorizer terminal received from the authorizer terminal 10 to perform authentication with reference to the approval information selected by the authorizer when the identification key for the authorizer terminal is matched with the identification key for the authentication server and perform authentication rejection for the user when the identification key for the authorizer terminal is not matched with the identification key for the authentication server.

In this case, the authentication server 20 performs authentication according to dynamic and one-time approval authority using the approval information selected by the authorizer in the authorizer terminal 10, unlike a conventional method of performing authentication by generating a one-time password such as an OTP and comparing whether a password input by the user is matched with the generated password. In addition, since a separate input for authentication by the user (alternatively, the authorizer) to access the service gate is not required, the authentication may be safe from hacking using a key log program and the like.

Next, when the access request signal to the service gate using the gate key is received from the user terminal 40, the service server 30 may transmit the authentication request signal for the user using the gate key to the authentication server 20.

In addition, when result information on the authentication for the user is received from the authentication server 20, the service server 30 may determine approval for the access of the user terminal 40 to the service gate in response to the result information on the authentication.

In addition, the service server 30 may support the user terminal 40 to display authentication approval or authentication rejection according to the result information on the authentication in response to the result information on the authentication received from the authentication server 20 and support the user terminal 40 to display a reason for the authentication rejection in addition to the authentication rejection.

Accordingly, the service server 30 determines the approval for the access to the gate by the approval information of the authorizer terminal 10 through the authentication server 30 without the information input by the user (alternatively, the authorizer) to prevent an accident that the user input information is exposed by a backdoor program, and the like of the user terminal. In addition, unlike the conventional method using the OTP and the like, the service server 30 does not store the user (alternatively, authorizer) information for the user (alternatively, authorizer) authentication to prevent a problem of leakage of the user (alternatively, authorizer) information.

Next, the user terminal 40 allows the user to use the service provided by the service server 30 through the service gale and may request access to the service gate to the service server 30 when the user intends to access the service gate using the gate key. In this case, the authorizer terminal 40 may include a dedicated terminal for authentication, a smart watch, a smart phone, a mobile terminal, a pad, a laptop computer, a PC, a cloud service, and the like.

In this case, since the user performs a request for the access to the service gate using the gate key through the user terminal 40 and does not input a separate input in the related art, for example, a password or the like, the user needs not to memorize the password or the like corresponding to each service, thereby improving convenience of the user. In addition, the user does not input separate information for authentication, thereby preventing the authentication information from being exposed by hacking and the like.

In addition, the user using the user terminal 40 may be the same as the authorizer using the authorizer terminal 10.

In the system configured as such, the method for determining the approval for the access to the gate through the network according to the exemplary embodiment of the present invention will be described below in more detail with reference to FIGS. 2 to 6.

Figure 2:
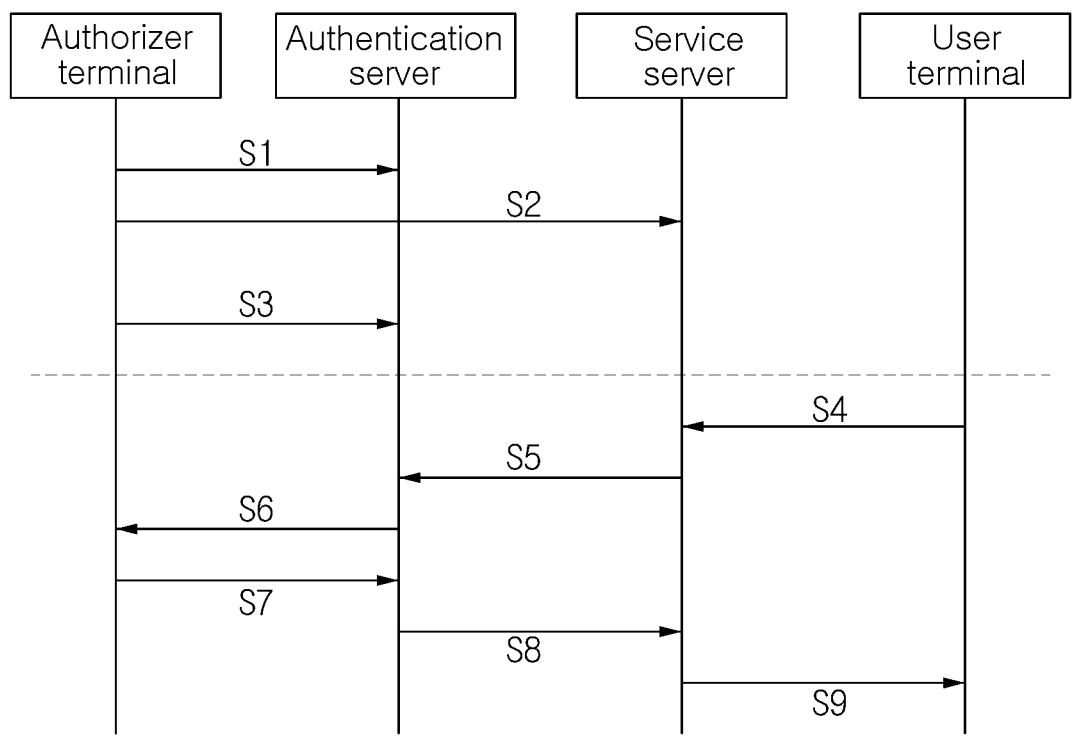
FIG. 2 schematically illustrates an operational state of performing the method for determining the approval for the access to the gate through the network according to the exemplary embodiment of the present invention.

First, referring to FIG. 2, the authorizer performs registration of the authorizer in the authentication server through the authorizer terminal (S1). In this case, the authorizer may input a link selection signal, a QR code, or a registration code value which corresponds to the authentication server to register the authorizer.

For example, when link information corresponding to the authentication server, that is, a link for a uniform resource locator (URL) for downloading and installing an application for performing the method according to the exemplary embodiment of the present invention is received to the authorizer terminal through SMS alarm information or push alarm information, the authorizer clicks the corresponding URL link to install the corresponding application on the authorizer terminal. Unlike this, the authorizer may directly access the URL by the authorizer terminal to install the corresponding application. In this case, the authorizer terminal may also request setting of a pin code to the authorizer for data security when the application is installed.

In addition, when the installation of the corresponding application is completed, the authorizer terminal displays the user interface to register the authorizer in the authentication server, and the authorizer inputs a QR code or a registration code value as the provided key value through the user interface to perform registration of the authorizer, that is, registration of the identification key in the authentication server.

In addition, when the gate is generated, the authorizer of the corresponding gate may set an additional request for information capable of identifying the user who accesses the gate, such as a telephone number, an e-mail address, a face photograph, personal videos, a business card image, an electronic employee certificate, multimedia information which may generally verify the user, such as an identification code value generated from a user terminal, that is, a terminal or an application installed in the terminal that provides personal identification or identification of the user, for example, an OTP generation terminal, a fingerprint/iris information input terminal, or the like, only at the time of the corresponding authentication.

Unlike this, when the authorizer clicks the link such as the URL corresponding to the authentication server, the authorizer may also perform the registration of the authorizer, that is, the registration of the identification key in the authentication server.

Then, the authentication server may designate identification information such as a universally unique identifier (UUID) for the identification key of the registered authorizer and store the identification information in a database in response to the authorizer information.

In other words, unlike the conventional method using the OTP or the like, since unique personal information for verifying the authorizer, for example, a date of birth, a resident registration number, and the like needs not to be permanently stored, a problem associated with leakage of the personal information does not occur.

In this case, the authentication server and the authorizer terminal are synchronized, and the identification key of the authorizer may be stored in the authentication server and the authorizer terminal, as an identification key for the authentication server which is the identification key managed by the authentication server and an identification key for the authorizer terminal which is the identification key managed by the authorizer terminal, respectively. In addition, the identification key for the authentication server and the identification key for the authorizer terminal may be changed according to a time or a counter. As an example, the identification key for the authentication server and the identification key for the authorizer terminal may be changed every predetermined time or changed whenever the authorizer terminal transmits the identification key for the authorizer terminal to the authentication server, that is, whenever the authentication is performed.

Next, referring to FIG. 2, the authorizer generates a gate key corresponding to a gate, which is access point of a service that can be self-controlled among services provided from the service servers (S2) and registers the generated gate key in the authentication server (S3). That is, the authorizer may configure the service server to use the identification method according to the exemplary embodiment of the present invention as a user authentication method.

At this time, the service gate may include a login of a web page, a start login of a service and contents, user authentication for using the contents, and the like, and the gate key may be defined as a web URL type including authorizer information for the corresponding service gate.

Next, referring to FIG. 2, when the user requests the access to the corresponding service gate to the service server by using the gate key through the user terminal (S4), the service server transmits an authentication request signal for the user which requests the access to the service gate to the authentication server by using the gate key (S5).

Figure 3:
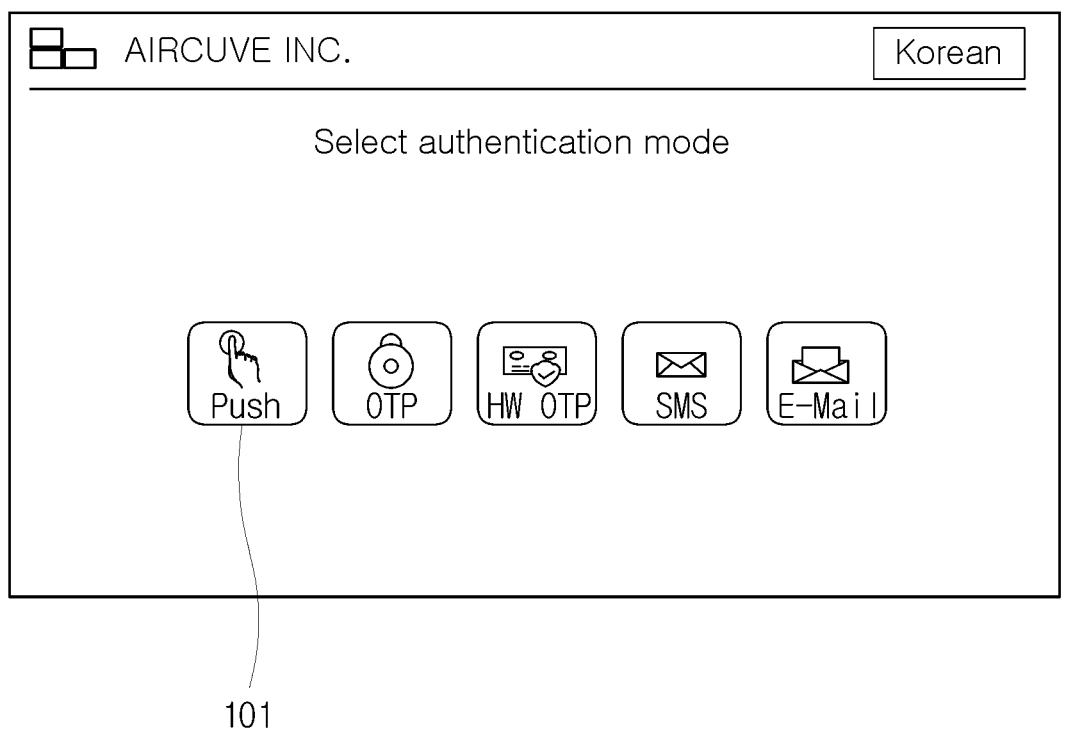
FIG. 3 schematically illustrates a user interface to allow a user to select an authentication method in the method for determining the approval for the access to the gate through the network according to the exemplary embodiment of the present invention.

In this case, as illustrated in FIG. 3, the user selects the method 101 according to the exemplary embodiment of the present invention from the service gate corresponding to a gate key set by a method for user authentication in a page serviced by the service server through the user terminal.

That is, unlike a conventional method of inputting information such as a password for user authentication, the user accesses the service gate requiring authentication using the set gate key without inputting the information such as a password.

Figure 4:
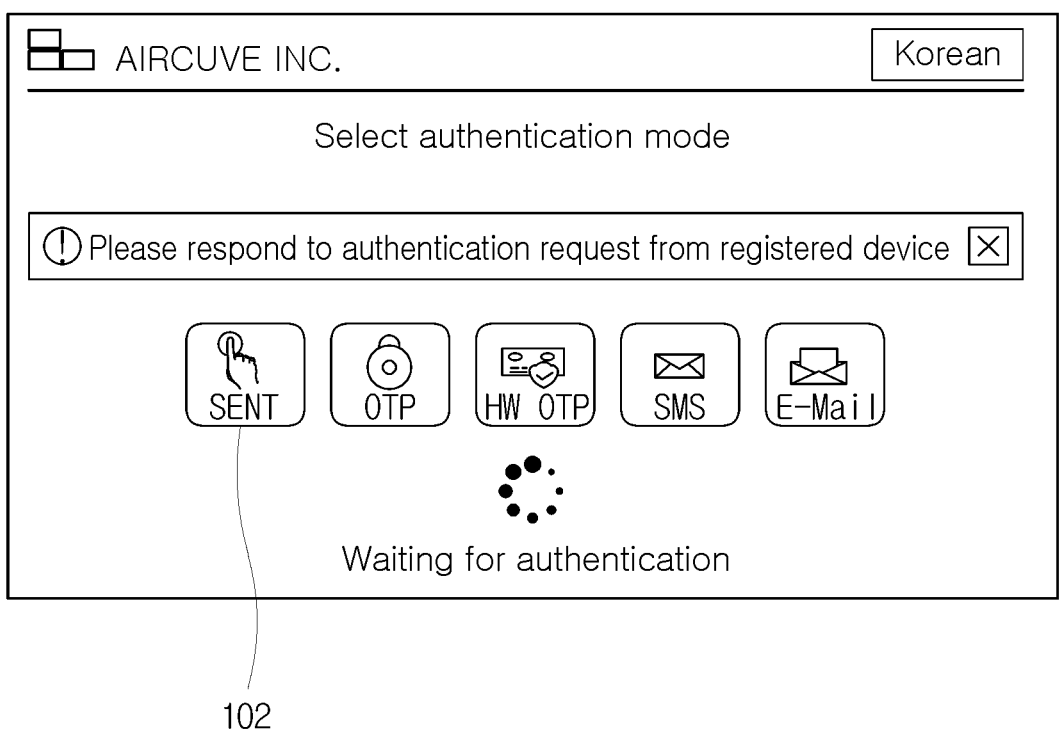
FIG. 4 schematically illustrates a state whether the user performs an authentication operation in the method for determining the approval for the access to the gate through the network according to the exemplary embodiment of the present invention.

Then, the service server transmits an authentication request signal for the user to the authentication server. In addition, as illustrated in FIG. 4, the service server displays a state 102 in which the authentication request signal is transmitted on the user terminal and waits for result information on the authentication to be received from the authentication server.

In this case, the service server may transmit time information requesting the access to the service gate and location information of the user requesting the access to the service gate by the user in addition to the authentication request signal.

As an example, the service server may transmit time an IP address of the user terminal, a type of user terminal, an access location, a capturing image of the user, a telephone number, a mail address, a login ID, and the like. That is, when the service gate to be accessed by the user terminal is primary authentication such as a login, the service server may collect and transmit information about the IP address of the user terminal, the type of user terminal, the access location, the capturing image of the user, and the like. When the service gate is secondary authentication, the service server may additionally collect and transmit user information such as a telephone number, a mail address, and a login ID according to the primary authentication in addition to the user information in the primary authentication.

Next, referring to FIG. 2, the authentication server verifies the authorizer corresponding to the gate key and transmits the approval request signal for the user to the verified authorizer terminal, in response to the user authentication request signal from the service server (S6).

At this time, the authentication server may transmit the service gate information, the user information, and the approval request signal for the user to the authorizer terminal. As an example, the authentication server may transmit access request time information, an IP address of the user terminal, a type of user terminal, an access request location, a capturing image of the user, a telephone number, a mail address, a login ID, and the like.

Figure 5:
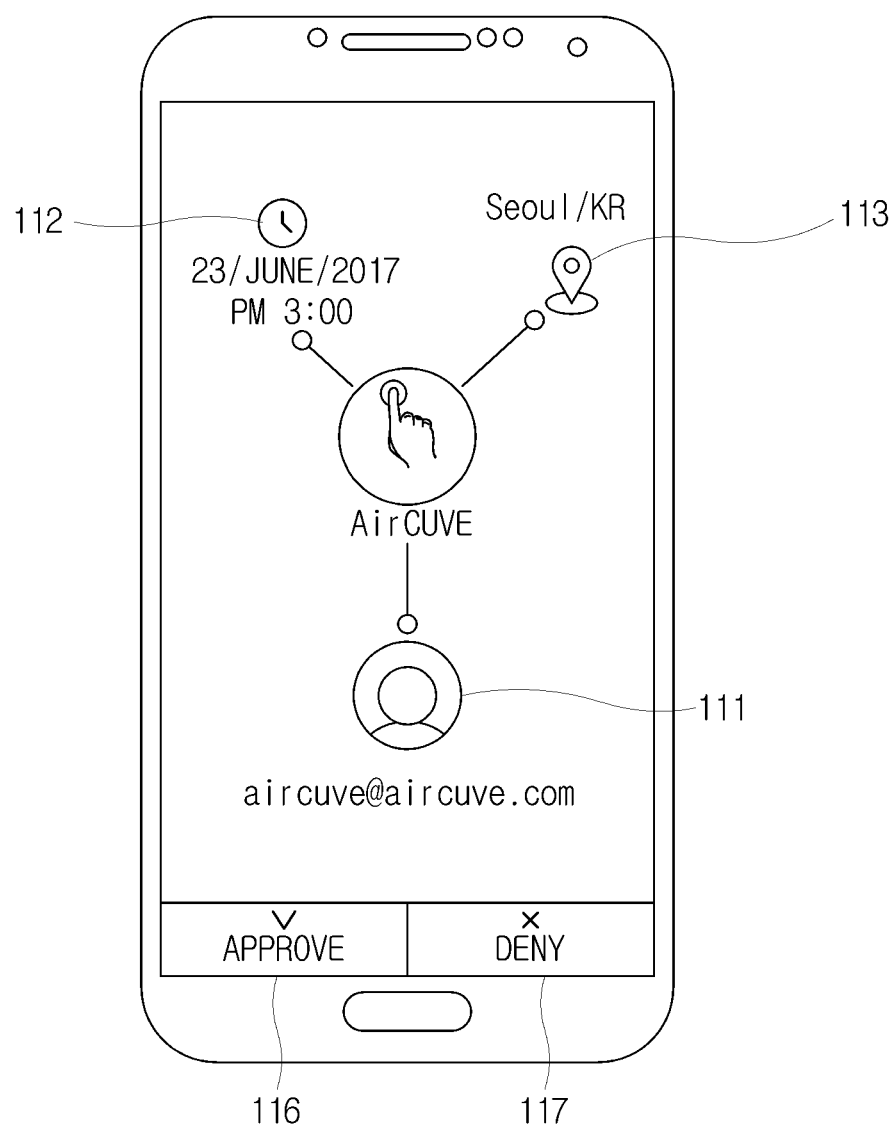
FIG. 5 schematically illustrates a user interface of an authorizer terminal to allow the authorizer to determine approval for the access in the method for determining the approval for the access to the gate through the network according to the exemplary embodiment of the present invention.
Figure 6:
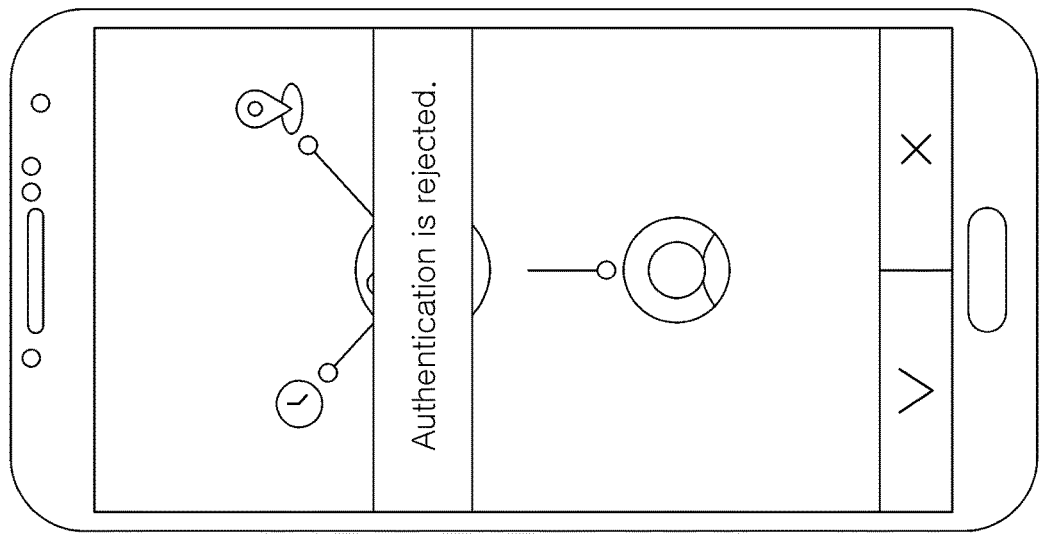
FIG. 6 schematically illustrates a state where the authorizer determines the approval for the access through the user interface of FIG. 5.
Figure 6:
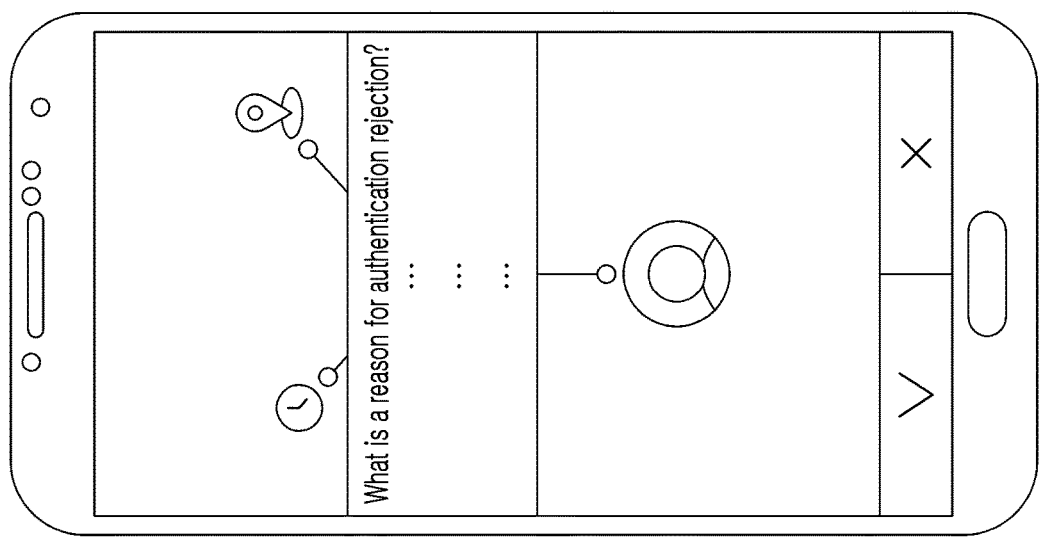
Figure 6:
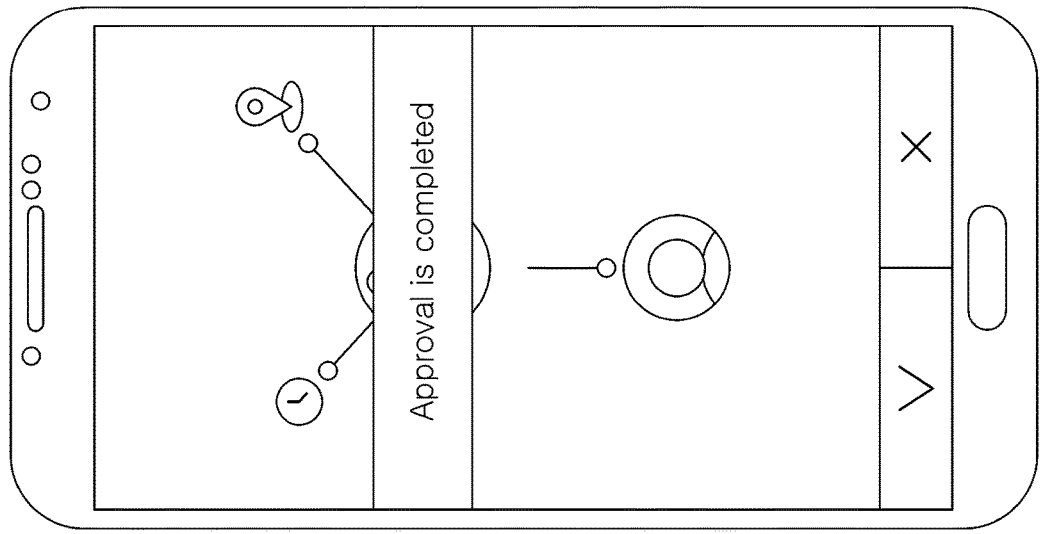

In addition, as illustrated in FIG. 5, the authorizer terminal displays service gate information and user information and provides a user interface for supporting the authorizer to select the approval in response to the approval request signal.

In this case, the user interface may include service gate information 111 corresponding to the approval request, access request time information 112, access request location information 113, and user information such as an IP address of the user terminal, a type of user terminal, a capturing image of the user, a telephone number, a mail address, and a login ID. Further, the user interface may include an approval button 116 and an approval rejection button 117 so that the authorizer may select the approval.

Further, unlike the case where the authentication server directly transmits the approval request signal to the authorizer terminal, when the authentication server transmits SMS alarm information or push alarm information corresponding to the approval request signal to the authorizer terminal so as to allow the authorizer to recognize that the approval request signal is present. In addition, when the authorizer verifies the SMS alarm information or the push alarm information through the authorizer terminal, the authentication server transmits the user information corresponding to the approval request signal and the like to allow the authorizer terminal to display the user interface illustrated in FIG. 5. In addition, while the SMS alarm information or the push alarm information is not verified, that is, the alarm is not received, even though the authorizer accesses the application through the authorizer terminal, the authentication server may also allow the authorizer terminal to display the user interface illustrated in FIG. 5 so that the authorizer may process the request content.

Then, the authorizer may verify information on the service gate requested for approval and information on the user requesting the approval through the user interface illustrated in FIG. 5 and determine the approval with reference to the verified user information.

That is, unlike the prior art in which related information is stored in the authentication server and then compared with the user information requested for authentication which is received to determine the authentication, when the user authentication request is present, the authorizer having authority for the authentication directly determines the approval for the service access of the user and as a result, dynamic user authentication is performed.

Next, referring to FIG. 2, when a selection signal for the approval is input from the authorizer through the user interface of FIG. 5, the authorizer terminal transmits the approval information selected by the authorizer to the authentication server (S7).

In this case, when the authorizer selects "approval" through the user interface, the authorizer terminal may display the "approval" selected state to be known by the authorizer as illustrated in FIG. 6A.

Further, when the authorizer selects "approval rejection" through the user interface, the authorizer terminal may provide a list of reasons for rejection to select a reason for the "approval rejection" as illustrated in FIG. 6B. As an example, the reasons for rejection may include "it's an unverifiable request", "it's a mistaken request", and the like and also include "select again". In particular, when the authorizer selects "select again", the authorizer terminal may display a user interface for selecting the approval of FIG. 5. In addition, when the authorizer selects any one reason for rejection from the rejection reason list as illustrated in FIG. 6B, the authorizer terminal may display the "approval rejection" selected state as illustrated in FIG. 6C.

Next, referring to FIG. 2, the authentication server performs authentication for the user with reference to the approval information received from the authorizer terminal and transmits the result information on the authentication to the service server (S8).

In this case, when the approval information received from the authorizer terminal is "approval", the authentication server authenticates approval for the access to the service gate for the user, and when the approval information is "approval rejection", the authentication server authenticates rejection of approval for the access to the service gate for the user.

Unlike this, the authorizer terminal may transmit the identification key for the authorizer terminal which is the identification key corresponding to the authorizer and managed by the authorizer terminal and the approval information selected by the authorizer to the authentication server. Then, the authentication server performs the authentication for the user with reference to the identification key for the authorizer terminal and the approval information. That is, the authentication server compares an identification key for the authentication server which is an identification key corresponding to the authorizer and managed by the authentication server with an identification key for the authorizer terminal received from the authorizer terminal to perform authentication with reference to the approval information when the identification key for the authorizer terminal is matched with the identification key for the authentication server and perform the authentication rejection for the user when the identification key for the authorizer terminal is not matched with the identification key for the authentication server. As a result, the authentication server rejects the approval performed by a third party or the like which is not an actual authorizer by hacking and the like, thereby improving security. Further, the authentication server and the authorizer terminal may change each identification key according to a time or a counter. As an example, the identification key for the authentication server and the identification key for the authorizer terminal may be changed every predetermined time or changed whenever the authorizer terminal transmits the identification key for the authorizer terminal to the authentication server, that is, whenever the authentication is performed.

As a result, the authentication server performs authentication for dynamic, one-time, and effective identification only when the approval for the access to the corresponding gate is determined at the time of requiring the authority for the approval for the access to the gate with reference to the approval information form the authorizer terminal. Thus, even if the identification information or the like is leaked, there is no vulnerability to reuse and arbitrary use by a third party may be prevented, thereby improving security.

Next, referring to FIG. 2, the service server determines approval for the access to the service gate through the user terminal according to progress information for the authentication transmitted from the authentication server (S9). That is, if the access approval is authenticated from the authentication server, the service gate enables the user to use the service provided by the service gate through the user terminal, and if the access rejection is authenticated from the authentication server, the service gate interrupts the user to access the service gate through the user terminal. In this case, the service server displays a reason for the access interruption to the user terminal, that is, a reason for the approval rejection selected by the authorizer through the authorizer terminal to display the access interrupted reason to be known by the user.

In this case, the service server determines the approval for the access to the gate by the approval information of the authorizer terminal through the authentication server without information input by the user. As compared with the conventional method using the OTP and the like, a separate information input for the authentication is not requested to the user, thereby improving convenience of the user and preventing an accident in which user input information is exposed by a backdoor program or the like of the user terminal. In addition, since the user information for user authentication is not stored, a problem associated with the leakage of the user information does not occur.

As such, in the method for determining the approval for the access to the gate through the network according to the exemplary embodiment of the present invention, an actual application example will be described below.

First, in the case where a general login page is set as the gate, in the case where the authentication for an account of the authorizer is set by the method according to the exemplary embodiment of the present invention, that is, in the case where the authorizer and the user are the same person, when the user accesses the login page through the gate key set in the service server without inputting a separate ID or password on the login page, a screen for determining whether or not to access the login page is displayed on the authorizer terminal by the operation of the service server and the authentication server. In addition, when determining "approval" through the authorizer terminal, the authentication server performs authentication of the login approval in the login page, and the service server performs the login in response to the approval result for the authentication of the authentication server.

Further, in the case where the authentication for the authorizer account is set by the method according to the exemplary embodiment of the present invention, when the authorizer does not log in and approves access to the designated third party, the designated third party may access the authorizer account without input of a password or the like. The authorizer may verify whether the third party is the third party designated by the authorizer through the information on the designated third party and approves the access to the account of the authorizer to the verified third party, thereby sharing the information with the third party without exposing the information such as the password or the like for the account of the authorizer.

Further, the authorizer may transmit a gate key in order to designate and invite the third party with respect to a specific page such as a blog. At this time, if there is an access request signal for the corresponding blog through the gate key, the authorizer may verify the information on the third party to access the blog through the authorizer terminal and allow only the designated third party to access the corresponding blog. Accordingly, the authorizer can approve the access to the corresponding blog for the designated third party without input of a password or the like.

In addition, it is possible to provide an authentication method which is dynamic and one-time and has improved security by identification without input of a password or the like, like the exemplary embodiment of the present invention in various application examples for verifying the user.

The exemplary embodiments of the present invention described above may be implemented in program command forms executable by various computer components and recorded in computer readable recording media. The computer readable recording medium may include one or a combination of a program command, a data file, and a data structure. The program command recorded on the computer readable recording medium may be specially designed and configured for the present invention, or may be publicly known to and used by those skilled in the computer software field. An example of the computer readable recording medium includes a magnetic media such as a hard disk, a floppy disk, and a magnetic tape, an optical media such as a CD-ROM and a DVD, a magneto-optical media such as a floptical disk, and a hardware device, such as a ROM, a RAM, and a flash memory, which is specially configured to store and execute a program command. An example of the program command includes a high-level language code executable by a computer by using an interpreter and the like, as well as a machine language code created by a compiler. The hardware device may be configured to be operated with one or more software modules in order to perform the operation of the present invention, and an opposite situation thereof is available.

As described above, the present invention has been described by the specified matters such as specific components and limited exemplary embodiments and drawings, which are provided to help the overall understanding of the present invention and the present invention is not limited to the exemplary embodiments, and those skilled in the art will appreciate that various modifications and changes can be made from the disclosure.

Therefore, the spirit of the present invention is limited to the exemplary embodiments described above, and it should be appreciated that all equal or equivalent modifications as well as the appended claims to be described below belong to the spirit of the present invention.

The invention claimed is:

1. A method for determining approval for access to a gate through a network, the method comprising:
(a) transmitting, by an authentication server, service gate information, user information, and an approval request signal for a user to an authorizer terminal when an authentication request signal for the user requesting access to a service gate using a gate key is received from a service server, to support the authorizer terminal to display the service gate information and the user information and support the authorizer to select the approval in response to the approval request signal; and
(b) performing, by the authentication server, authentication for the user with reference to approval information and transmitting result information on the authentication to the service server when the approval information selected by the authorizer is received from the authorizer terminal, to support the service server to determine approval for the access to the service gate for the user,
wherein, in step (a), the authentication server transmits time information requesting access to the service gate and location information of the user requesting the access to the service gate by the user to the authorizer terminal to support the authorizer terminal to display the transmitted information, wherein, in step (b), the authentication server compares an identification key of the authentication server, which corresponds to the authorizer and is managed by the authentication server, with an identification key of the authorizer terminal received from the authorizer terminal, wherein the identification key of the authorizer terminal corresponding to the authorizer and is managed by the authorizer terminal, to perform authentication approval for the user, with reference to the approval information, when the identification key of the authentication server and the identification key of the authorizer terminal are matching and to perform authentication rejection for the user when the identification key of the authentication server and the identification key of the authorizer terminal are not matching, wherein the identification key of the authentication server and the identification key of the authorizer terminal are saved in the authentication server and the authorizer terminal respectively, and the authentication server changes the identification key of the authentication server regularly over a predetermined time interval or whenever authentication is performed, and wherein the authentication server communicates a link of an application to the authorizer terminal to permit the authorizer to install the application on the authorizer terminal wherein the authentication server, via the application, provides identification information corresponding to the identification key of the authorizer, and the authorizer generates the gate key corresponding to the gate.

2. The method of claim 1, further comprising:
before step (a),
(a0) transmitting, by the authentication server, SMS alarm information or push alarm information corresponding to the approval request signal to the authorizer terminal to support the authorizer terminal to display the SMS alarm information or the push alarm information,
wherein step (a) is performed when a verification request signal corresponding to the SMS alarm information or the push alarm information is received from the authorizer terminal.

3. The method of claim 1, wherein the authentication information includes authentication approval information for the user, or authentication rejection information for the user and a reason for the authentication rejection.

4. The method of claim 1, further comprising:
before step (a),
(a1) supporting the authorizer to perform registration of the authorizer by the authentication server, when an access request signal to the authentication server by a link selection signal, a QR code, or a registration code value is received from the authorizer terminal.

5. A method for determining approval for access to a gate through a network, the method comprising:
(a) transmitting, by a service server, user information corresponding to a gate key, service gate information and an authentication request signal for a user corresponding to the user information to an authentication server when an access request signal for a service gate using the gate key is received from a user terminal, to support the authentication server to transmit the user information, the service gate information, and an approval request signal for the user to an authorizer terminal and support the authentication server to perform the authentication for the user with reference to approval information selected by an authorizer received from the authorizer terminal; and (b) determining, by the service server, approval for the access to the user terminal for the service gate in response to result information on the authentication when the result information on the authentication for the user is received from the authentication server, wherein, the authentication server is configured to compare an identification key of the authentication server, which corresponds to the authorizer and is managed by the authentication server, with an identification key of the authorizer terminal received from the authorizer terminal, wherein the identification key of the authorizer terminal corresponds to the authorizer and is managed by the authorizer terminal, to perform authentication approval for the user, with reference to the approval information, when the identification key of the authentication server and the identification key of the authorizer terminal are matching and to perform authentication rejection for the user when the identification key of the authentication server and the identification key of the authorizer terminal are not matching, wherein the identification key of the authentication server and the identification key of the authorizer terminal are saved in the authentication server and the authorizer terminal respectively, and the authentication server changes the identification key of the authentication server regularly over a predetermined time interval or whenever authentication is performed, wherein the service server transmits time information requesting the access to the service gate and location information of the user terminal requesting the access to the service gate by the user terminal to the authentication server, and wherein the authentication server communicates a link to the authorizer terminal to permit the authorizer to install an application on the authorizer terminal wherein the authentication server, via the application, provides identification information corresponding to an identification key of the authorizer, and the authorizer generates the gate key corresponding to the gate.

6. The method of claim 5, wherein the service server supports the user terminal to display authentication approval or authentication rejection according to result information on the authentication and support the user terminal to display a reason for the authentication rejection in addition to the authentication rejection, in response to the result information on the authentication received from the authentication server.

7. An authentication server of determining approval for access to a gate through a network, the authentication server comprising:
a communication unit stored in a memory of the authentication server; and
a processor (i) transmitting service gate information, user information, and an approval request signal for a user to an authorizer terminal through the communication unit when an authentication request signal for the user requesting access to a service gate using a gate key is received from a service server through the communication unit, to support the authorizer terminal to display the service gate information and the user information and support the authorizer to select an approval in response to the approval request signal, and (ii) performing the authentication for the user with reference to approval information and transmitting result information on the authentication to the service server through the communication unit when the approval information selected by an authorizer is received from the authorizer terminal through the communication unit, to support the service server to determine approval for the access to the service gate for the user, wherein the processor transmits time information requesting the access to the service gate and location information of the user requesting the access to the service gate by the user to the authorizer terminal through the communication unit to support the authorizer terminal to display the transmitted information, wherein the processor compares an identification key of the authentication server, which corresponds to the authorizer and is managed by the processor, with an identification key of the authorizer terminal received from the authorizer terminal, wherein the identification key of the authorizer terminal corresponds to the authorizer and is managed by the authorizer terminal, to perform authentication approval for the user, with reference to the approval information, when the identification key of the authentication server and the identification key of the authorizer terminal are matching and perform authentication rejection for the user when the identification key of the authentication server and the identification key of the authorizer terminal are not matching, wherein the processor changes the identification key of the authentication server regularly over a predetermined time or whenever authentication is performed, wherein the processor transmits time information requesting the access to the service gate and location information of the user terminal requesting the access to the service gate by the user terminal to the authentication server through the communication unit to support the authorizer terminal to display the transmitted information, wherein the communication unit is executed by the processor, and wherein the authentication server communicates a link of an application to the authorizer terminal to permit the authorizer to install the application on the authorizer terminal wherein the authentication server, via the application, provides identification information corresponding to the identification key of the authorizer, and the authorizer generates the gate key corresponding to the gate.

8. The authentication server of claim 7, wherein before the operation of (i), the processor
(i0) transmits SMS alarm information or push alarm information corresponding to the approval request signal to the authorizer terminal through the communication unit, and
performs the operation of (i) when a verification request signal corresponding to the SMS alarm information or the push alarm information is received from the authorizer terminal through the communication unit.

9. The authentication server of claim 7, wherein the authentication information includes authentication approval information for the user, or authentication rejection information for the user and a reason for the authentication rejection.

10. The authentication server of claim 7, wherein before the operation of (i), the processor
(i1) supports the authorizer to perform the registration of the authorizer through the authorizer terminal, when an access request signal to the authentication server by a link selection signal, a QR code, or a registration code value is received from the authorizer terminal through the communication unit.

11. A service server of determining approval for access to a gate through a network, the service server comprising:
a communication unit stored in a memory of the service server; and
a processor (i) transmitting user information corresponding to a gate key, service gate information and an authentication request signal for a user corresponding to the user information to an authentication server through the communication unit when an access request signal for the service gate using the gate key is received from the user terminal through the communication unit, to support the authentication server to transmit the user information, the service gate information, and the approval request signal for the user to the authorizer terminal and support the authentication server to perform the authentication for the user with reference to the approval information selected by the authorizer received from the authorizer terminal, and (ii) determining approval for access of the user terminal to the service gate in response to result information on the authentication when the result information on the authentication for the user is received from the authentication server through the communication unit, wherein, the authentication server is configured to compare an identification key of the authentication server, which corresponds to the authorizer and is managed by the authentication server, with an identification key of the authorizer terminal received from the authorizer terminal, wherein the identification key of the authorizer terminal corresponds to the authorizer and is managed by the authorizer terminal, to perform authentication approval for the user, with reference to the approval information, when the identification key of the authentication server and the identification key of the authorizer terminal are matching and to perform authentication rejection for the user when the identification key of the authentication server and the identification key of the authorizer terminal are not matching, wherein the identification key of the authentication server and the identification key of the authorizer terminal are saved in the authentication server and the authorizer terminal respectively, and the authentication server changes the identification key of the authentication server regularly over a predetermined time interval or whenever authentication is performed, wherein the processor transmits time information requesting the access to the service gate and location information of the user terminal requesting the access to the service gate by the user terminal to the authentication server through the communication unit, wherein the communication unit is executed by the processor, and wherein the authentication server communicates a link to the authorizer terminal to permit the authorizer to install an application on the authorizer terminal wherein the authentication server, via the application, provides identification information corresponding to an identification key of the authorizer, and the authorizer generates the gate key corresponding to the gate.

12. The service server of claim 11, wherein the processor supports the user terminal to display authentication approval or authentication rejection according to result information on the authentication and support the user terminal to display a reason for the authentication rejection in addition to the authentication rejection, in response to the result information on the authentication received from the authentication server through the communication unit.

13. A non-transitory computer-readable storage medium storing a computer program comprising a set of instructions, when executed, arranged to cause a computer to implement the method according to claim 1.

14. A non-transitory computer-readable storage medium storing a computer program comprising a set of instructions, when executed, arranged to cause a computer to implement the method according to claim 5.

* * * * *